United States Patent
Grun et al.

(10) Patent No.: US 9,810,586 B2
(45) Date of Patent: Nov. 7, 2017

(54) TEMPERATURE SENSOR AND THERMAL, FLOW MEASURING DEVICE

(71) Applicant: Endress + Hauser Flowtec AG, Reinach (CH)

(72) Inventors: Alexander Grun, Lorrach (DE); Hanno Schultheis, Lorrach (DE); Tobias Baur, Reinach (CH)

(73) Assignee: Endres + Hauser Flowtec AG, Reinach (CH)

( * ) Notice: Subject to any disclaimer, the term of this patent is extended or adjusted under 35 U.S.C. 154(b) by 83 days.

(21) Appl. No.: 14/436,933

(22) PCT Filed: Sep. 23, 2013

(86) PCT No.: PCT/EP2013/069680
§ 371 (c)(1),
(2) Date: Apr. 20, 2015

(87) PCT Pub. No.: WO2014/060186
PCT Pub. Date: Apr. 24, 2014

(65) Prior Publication Data
US 2015/0276503 A1    Oct. 1, 2015

(30) Foreign Application Priority Data

Oct. 19, 2012  (DE) .................. 20 2012 104 039 U
Jul. 29, 2013  (DE) .................. 20 2013 103 404 U

(51) Int. Cl.
*G01K 7/16*     (2006.01)
*G01F 1/684*    (2006.01)
(Continued)

(52) U.S. Cl.
CPC .............. *G01K 7/16* (2013.01); *G01F 1/684* (2013.01); *G01F 1/69* (2013.01); *G01F 1/692* (2013.01);
(Continued)

(58) Field of Classification Search
CPC ....... G01D 11/245; G01F 15/14; G01F 1/684; G01F 1/69; G01F 1/692; G01F 1/696; G01K 1/08; G01K 7/16; G01K 7/18
See application file for complete search history.

(56) References Cited

U.S. PATENT DOCUMENTS 4,135,396 A * 1/1979 Stanke .................. G01F 1/684
                                                    73/204.19
4,476,720 A   10/1984 Ismail et al.
(Continued)

FOREIGN PATENT DOCUMENTS

CN       2784896 Y      5/2006
CN     101055202 A     10/2007
(Continued)

OTHER PUBLICATIONS

English Translation of International Preliminary Report on Patentability, WIPO, Geneva, Apr. 30, 2015.
(Continued)

*Primary Examiner* — Francis Gray
(74) *Attorney, Agent, or Firm* — Bacon & Thomas, PLLC

(57) ABSTRACT

A temperature sensor comprising a housing having a housing body and a housing chamber, in which housing chamber are arranged terminally two temperature sensor elements, which are especially embodied as thin-film resistance thermometers, one of the temperature sensor elements is heatable, and from each temperature sensor element at least one connection wire leads away, which is connected with a circuit board. The circuit board is arranged in the housing chamber. The circuit board is positioned in the housing chamber by a snap-in connection. A connection wire of a first temperature sensor element is led with strain relief in a first direction through the circuit board and connected with such. The housing chamber contains at least a first elastic body. The circuit board has a first number of cavities, for (Continued)

connection of connection wires and/or cables and a second number of cavities, for reducing thermal expansion of the circuit board. Also presented is a thermal, flow measuring device.

15 Claims, 1 Drawing Sheet

(51) Int. Cl.
  G01F 1/69 (2006.01)
  G01K 7/18 (2006.01)
  G01F 1/692 (2006.01)
  G01F 15/14 (2006.01)
  G01K 1/08 (2006.01)
  G01F 1/696 (2006.01)
  G01D 11/24 (2006.01)

(52) U.S. Cl.
  CPC .............. *G01F 1/696* (2013.01); *G01F 15/14* (2013.01); *G01K 1/08* (2013.01); *G01K 7/18* (2013.01); *G01D 11/245* (2013.01)

(56) References Cited

U.S. PATENT DOCUMENTS

| | | | |
|---|---|---|---|
| 5,428,994 A * | 7/1995 | Wenzel | G01F 1/684 73/204.22 |
| 5,695,110 A | 12/1997 | Schirmer | |
| 5,848,094 A * | 12/1998 | Buhl | G01F 1/684 374/147 |
| 5,892,149 A | 4/1999 | Theuer | |
| 7,293,457 B2 | 11/2007 | Uramachi et al. | |
| 7,661,877 B2 | 2/2010 | Kitahara | |
| 7,832,269 B2 | 11/2010 | Bey, Jr. | |
| 8,899,830 B2 | 12/2014 | Pfau et al. | |
| 2006/0112763 A1 | 6/2006 | Uramachi | |
| 2007/0024411 A1 | 2/2007 | Lang et al. | |
| 2014/0109664 A1* | 4/2014 | Wiest | G01K 1/08 73/204.22 |
| 2015/0300856 A1* | 10/2015 | Pfau | G01P 5/12 73/204.11 |

FOREIGN PATENT DOCUMENTS

| | | |
|---|---|---|
| CN | 101329187 A | 12/2008 |
| DE | 7832695 U2 | 4/1980 |
| DE | 19504608 A1 | 8/1996 |
| DE | 19719010 A1 | 11/1997 |
| DE | 69410061 T2 | 1/1999 |
| DE | 19832533 C1 | 11/1999 |
| DE | 102010061731 A1 | 5/2012 |
| EP | 0652420 B1 | 6/1999 |
| EP | 0974809 A2 | 1/2000 |
| JP | 11351975 A | 12/1999 |

OTHER PUBLICATIONS

International Search Report EPO, The Netherlands, Sep. 2, 2014.
German Search Report, German PTO, Munich, Apr. 26, 2013.

* cited by examiner

TEMPERATURE SENSOR AND THERMAL, FLOW MEASURING DEVICE

TECHNICAL FIELD

The invention relates to a temperature sensor as well as to a thermal, flow measuring device.

BACKGROUND DISCUSSION

Known are sensors for flow measuring devices, which work according to the thermal measuring principle. This measuring principle is based on the cooling of a heated resistance thermometer, subsequently also referred to herein as the heating, or active, sensor element, from which heat is withdrawn by the flowing measured medium. The withdrawn energy is resupplied by increasing the electrical heating current. In this way, a constant temperature difference is maintained between the heating and measuring sensor element, thus the active sensor element, and a reference temperature sensor, which is referred to subsequently here in also as the measuring or passive sensor element. The greater the mass flow, the more energy is required, in order to maintain this difference. The measured heating current is, as a result thereof, proportional to the mass flow. The thermal measuring principle is well established in processes, in which a product is made from a raw or starting material by the application of chemical, physical or biological procedures and is applied successfully in numerous applications. Especially demanding is the application of the measuring principle in water and other liquids such as e.g. oil, since in such cases the heat transfer and the required heating power are significantly higher in comparison to gases. In the case of velocities >2.5 m/s, therefore, a flattening of the characteristic curve and therewith a lessened sensitivity can be experienced. Moreover, at smaller separations of the sensor elements from one another, in given cases, crosstalk from the heating sensor element to the temperature measuring sensor element can be experienced, e.g. in the case of low velocities <0.2 m/s.

Known are sensors, which are composed of two sensor elements, a heating element and a measuring element, which each have a cylindrical sensor cap and which protrude from a base surface of a sensor. Soldered in the end face of the sensor caps are resistance sensors. Due to the cylindrical sensor caps, the sensor elements have good thermal insulation. These sensors exhibit, however, a worse characteristic in water than the earlier mentioned sensors. Thus, in the case of increasing flow, the characteristic curve reaches comparatively rapidly a saturation, at which a maximum power is suppliable. Upon reaching this power limit, even at greater velocity, heat can no longer be transferred into the flow. Since the characteristic curve represents the measuring range for the flow velocity of the medium, within which a measuring can occur, a fast reaching of saturating means measuring is no longer possible in the case of flows that are too fast.

To this point in time, connection concepts for RTDs in sensor housings are used, which involve mounting the RTDs in sleeves. Their connection wires are led out of the sleeves.

SUMMARY OF THE INVENTION

An object of the present invention is to enable an easier mounting of the temperature sensor, as well as to provide a corresponding flow measuring device According to the invention, a temperature sensor includes a housing having a housing body and a housing chamber, in which housing chamber are arranged terminally two temperature sensor elements, which are especially embodied as thin-film resistance thermometers, wherein one of the temperature sensor elements is heatable, wherein from each temperature sensor element at least one connection wire leads away, which is connected with a circuit board, wherein the circuit board is arranged in the housing chamber, wherein the circuit board is positioned in the housing chamber by a snap-in connection.

Positioning the circuit board in the housing chamber by means of a snap-in connection facilitates assembly.

It is advantageous, when the housing chamber has a reinforcing layer, which reinforcing layer has or forms for the snap-in of the circuit board a recess means, thus a recess, or a protrusion. This is especially advantageous, when a terminally located part of the housing is embodied as a deep draw cap with a wall thickness of less than 2 mm, preferably less than 1.5 mm, especially less than 0.8 mm.

In order to enable a lasting connection of the reinforcing layer to the housing body, a material bonding between the components can be used, for example, by welding or soldering.

Furthermore, according to the invention, a temperature sensor includes a housing having a housing body and a housing chamber, in which housing chamber are arranged terminally two temperature sensor elements, which are especially embodied as thin-film resistance thermometers, wherein one of the temperature sensor elements is heatable, wherein from each temperature sensor element at least one connection wire leads away, which is connected with a circuit board, wherein a connection wire of a first temperature sensor element is led with strain relief in a first direction through the circuit board and connected with such.

The strain relieving connection, respectively securement of the connection wire with the circuit board, prevents detachment of the connection wire.

An especially advantageous, two-sided strain relief is achieved by leading at least one connection wire of a second temperature sensor element with strain relief in a second direction opposite the first direction through the circuit board and connecting such therewith.

Advantageously, the connection wire is surrounded in the region of the circuit board with a potting compound.

According to the invention, a temperature sensor includes a housing having a housing body and a housing chamber, in which housing chamber are arranged terminally two temperature sensor elements, which are especially embodied as thin-film resistance thermometers, wherein one of the temperature sensor elements is heatable, wherein from each temperature sensor element at least one connection wire leads away, which is connected with a circuit board, wherein the housing chamber contains at least a first elastic body for guiding the connection wire.

The elastic body, which can be embodied, for example, as a disk, provides a lesser susceptibility of the measurement signal to influence by vibrations.

Thus, it is advantageous, when the housing, especially the housing chamber, has a second elastic body, which is supported on the first elastic body and/or on a wall of the housing. The housing chamber includes, in such case, a potting compound, wherein the temperature sensor elements are arranged advantageously free of potting compound in the housing chamber.

Especially, the first and second elastic bodies can be silicone bodies. Silicone has good temperature resistance and good chemical durability.

A good state of sealing by the elastic bodies, especially in the case of their embodiment as silicone bodies, can also be achieved in the case of temperature sensors, which are embodied as four conductor measuring devices.

According to the invention, a temperature sensor includes a housing having a housing body and a housing chamber, in which housing chamber are arranged terminally two temperature sensor elements, which are embodied especially as thin-film resistance thermometers, wherein one of the temperature sensor elements is heatable, wherein from each temperature sensor element at least one connection wire leads away, which is connected with a circuit board, wherein the circuit board has a first number of cavities, especially holes, for connection of connection wires and/or cables and a second number of cavities, especially holes, for reducing thermal expansion of the circuit board.

Reducing thermal expansion can prevent damage to the circuit board.

In such case, the second number of cavities, especially holes, can be arranged in conductive traces arranged on the circuit board.

BRIEF DESCRIPTION OF THE DRAWINGS

A example of an embodiment of the invention will now be described in greater detail based on the drawing, the figures of which show as follows.

DETAILED DISCUSSION IN CONJUNCTION WITH THE DRAWINGS

Figure 1:
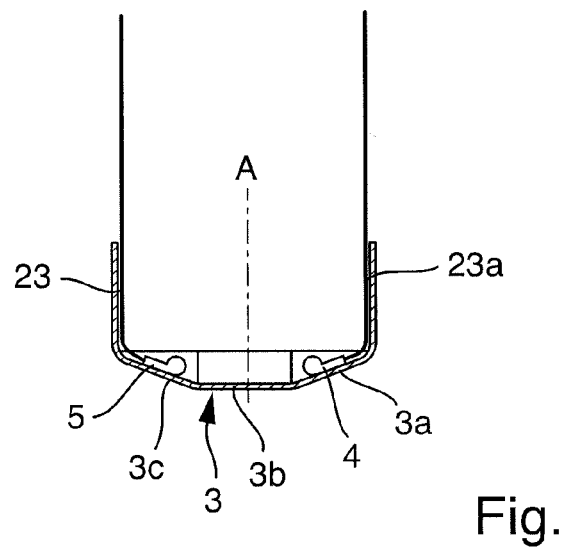
FIG. 1 is a sectional view of a housing of a sensor of a thermal flow device.

FIG. 1 shows a sensor of a thermal, flow measuring device, wherein the sensor is embodied as a thermal, mass flow sensor 1.

Conventional, thermal, flow measuring devices usually use two heatable resistance thermometers, which are embodied as equally as possible and arranged in, most often, pin-shaped, metal sleeves, so-called stingers, or in cylindrical metal sleeves in thermal contact with the medium flowing through a measuring tube or through the pipeline. For industrial application, the two resistance thermometers are usually installed in a measuring tube; the resistance thermometers can, however, also be mounted directly in the pipeline. One of the two resistance thermometers is a so-called active sensor element, which is heated by means of a heating unit.

Provided as heating unit is either an additional resistance heater, or, in case the resistance thermometer is a resistance element, e.g. an RTD—(Resistance Temperature Device) sensor, such is heated by conversion of electrical power, e.g. by a corresponding variation of the measuring electrical current. The second resistance thermometer is a so-called passive sensor element: It measures the temperature of the medium.

Usually in a thermal, flow measuring device, a heatable resistance thermometer is so heated that a fixed temperature difference is maintained between the two resistance thermometers. Alternatively, it is also known to supply via a control unit a constant heating power.

If there is no flow in the measuring tube, then an amount of heat constant with time is required for maintaining the predetermined temperature difference. If, in contrast, the medium to be measured is moving, then the cooling of the heated resistance thermometer is essentially dependent on the mass flow of the medium flowing past. Since the medium is colder than the heated resistance thermometer, the flowing medium transports heat away from the heated resistance thermometer. In order thus in the case of a flowing medium to maintain the fixed temperature difference between the two resistance thermometers, an increased heating power is required for the heated resistance thermometer. The increased heating power is a measure for the mass flow, respectively the mass flow of the medium through the pipeline.

If, in contrast, a constant heating power is fed in, then, as a result of the flow of the medium, the temperature difference between the two resistance thermometers lessens.

The particular temperature difference is then a measure for the mass flow of the medium through the pipeline, respectively through the measuring tube.

There is, thus, a functional relationship between the heating energy needed for heating the resistance thermometer and the mass flow through a pipeline, respectively through a measuring tube. The dependence of the heat transfer coefficient on the mass flow of the medium through the measuring tube, respectively through the pipeline, is utilized in thermal, flow measuring devices for determining the mass flow. Devices, which operate according to this principle, are manufactured and sold by the applicant under the marks, 't switch', 't trend' or 't mass'.

Figure 2:
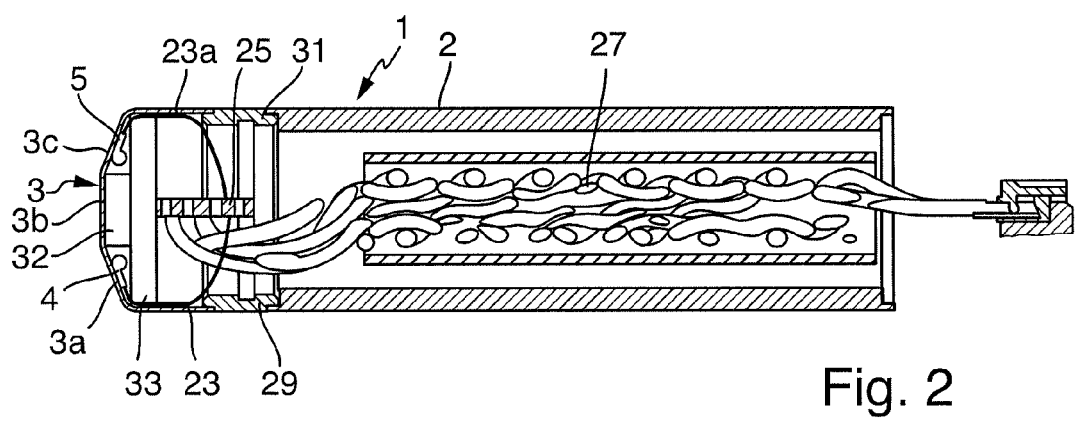
FIG. 2 is a sectional view of a sensor of the invention.

In ascertaining the mass flow, a thermal, flow measuring device can in the case of measuring liquids reach a highest power limit. Since liquids have compared with gases essentially higher thermal conduction coefficients, at higher velocity a greater heat energy is transported away from the surface of the active temperature sensor. In the case of increasing velocity of the medium, a saturation, respectively the upper power limit of the resistance thermometer, is rapidly achieved, so that the measuring range of liquids is limited to small flow velocities. This disadvantage is removed by a sensor of a thermal, flow measuring device, such as shown in FIGS. 1-2.

FIG. 1 shows a sensor 1 for a thermal, flow measuring device. Sensor 1 includes a sensor body 2 with a cylindrical shape, a longitudinal axis A and a terminal end face 3 with a midpoint M, through which the longitudinal axis A extends. This cylindrical sensor body has a diameter d between preferably 10-30 mm, especially between 15-22 mm and includes additionally an inner housing chamber. End face 3 is divided into a number of segments 3a-3c. The segments are arranged next to one another with a first side segment 3a, a middle segment 3b and a second side segment 3c.

In such case, at least a first side segment in the sectional view of FIG. 1 is embodied as a surface inclined relative to the longitudinal axis A. The surface normal vector of the inclined surface forms with the longitudinal axis an angle α of preferably at least 5°, preferably at least 8°, especially preferably between 10-35°. In such case, the surface can especially be embodied flat, have irregularities due to surface roughness or be arc shaped toward the measured medium or away from the measured medium.

The first side segment 3a is preferably a side segment, whose surface is inclined in the direction of the flowed on side of the sensor 1, thus counter to the flow direction S.

Arranged behind the first side segment 3a is a first temperature sensor element, which is embodied in the present instance as a resistance thermometer 4, whose construction will now be described in greater detail based on an example of an embodiment. Resistance thermometer 4 is preferably embodied as a thin layer element. Resistance thermometer 4 has a three layered construction, including a ceramic substrate, a meander shaped metal layer, preferably of platinum, and a glass protective layer arranged thereon. The metal wire has a supply and a drain.

Temperature measurement occurs by exploiting the temperature dependence of electrical resistance in the case of conductance of electrical current. In this operating state, the resistance thermometer 4 can be applied as passive sensor element. The above-described resistance thermometer 4 measures as passive sensor element the temperature of the medium and introduces as active sensor element with adjustment of the electrical current level also an amount of heat into the medium. Then the resistance thermometer 4 of the first side segment 3a is an active sensor element, which has a constant temperature and emits heat energy to the medium flowing past.

This sensor element, respectively resistance thermometer 4, is preferably constructed as a plate shaped, thin layer element. In an especially preferred embodiment of the invention, the plate-shaped thin layer element is oriented essentially parallel to the surface of the first side segment 3a. Smaller deviations of less than 10°, preferably less than 5°, from the parallel plane can occur in such case.

In the following, a first embodiment will now be described, in which the first resistance thermometer 4, which is arranged on or behind the first side segment 3a, is operated as active sensor element. In such case, the flowed on side of side element 3a is the segment of the end face 3, against which the flow of the medium first strikes in the flow direction S.

In manner similar to the first resistance thermometer 4, preferably a second temperature element, which is embodied as a resistance thermometer 5, is arranged in the sensor 1 behind the second side segment 3c. In such case, this second resistance thermometer 5 functions in this first embodiment as a passive resistance thermometer for registering the temperature of the medium.

Especially preferably, the middle segment 3b includes an area with a surface normal vector, which extends along the longitudinal axis. Smaller deviations of less than 1°, preferably less than 0.5°, from the parallel plane can occur in such case.

Furthermore, especially preferably, the second side segment in the sectional view of FIG. 1 is embodied as a surface inclined relative to the longitudinal axis A. Thus, its surface normal vector forms with the longitudinal axis A an angle β of preferably at least 5°, preferably at least 8°, especially preferably between 10-35°. In such case, the surface can especially be embodied flat, have irregularities due to surface roughness or extend arc shaped toward the measured medium or away from the measured medium.

This second side segment 3c is preferably a side segment, whose surface is inclined in the flow direction S of the measured medium.

The effects achieved by the particular embodiment of the sensor 1 in combination with the active sensor element 4 arranged at the first end 3a will now be explained in greater detail.

The inclination of the first side segment 3a arranged on the flowed on side effects a lessening of the thermal boundary layer thickness compared to a level surface. Nevertheless, a thin boundary layer does develop comparatively uniformly over the entire surface. This boundary layer reduces the heat emission of the active sensor element. In other words, the presence of the boundary layer lessens the temperature gradient between medium and sensor surface, whereby a lesser heat input occurs. Due to the boundary layer, the sensor requires a smaller power in measurement operation.

In a second preferred embodiment of the invention, the second resistance thermometer 5 of the second side segment 3c arranged downstream is operated as active sensor element and the first resistance thermometer 4 of the first side segment 3a arranged upstream is operated as passive sensor element.

In the case of smaller flow velocities, a boundary layer structure occurs over the entire end face 3 of the sensor and is present with especially great thickness in the downstream region. This boundary layer enables, such as already described in the preceding example of an embodiment, a smaller heat input into the medium and therewith a delaying of the degree of saturation at higher flow velocities of the medium.

In the rear part at the transition between the middle segment 3b and the second downstream side segment 3c, additionally a tearoff edge is created, where the flow tears off in the case of higher velocities. At the same time, in the case of increased velocity of the medium, a recirculation occurs, thus a flow which is at least partially opposite to the principal flow direction. This recirculation is slower, preferably at least 20% slower, especially preferably at least 40% slower, than the main flow, but is, however, proportional to the main flow. The part of the recirculation directed opposite the main flow moves against the second downstream side downstream of the transition, respectively below the tearoff edge of the segment, and absorbs, in such case, a smaller heat energy than would be the case for the main flow. In this way, less power is required for maintaining the temperature and a power saturation occurs only at very high flow velocities.

Thus, the optimized geometry of the sensor relies on two different phenomena, the forming of a flow velocity dependent recirculation in the downstream region at high velocities and the forming of the uniform boundary layer in the flowed on region.

In summary, the new sensor geometry delivers more stable and more reliable measured values than previous geometries.

In an additional embodiment (not shown), the end face is superimposed as a cap on a cylindrical sensor, so that the cap in the case fouling is simply exchangeable. Alternatively, these caps can also be superimposed on already existing sensors, especially those with planar ends, so that a retrofitting of already existing sensors is possible.

The Biot number, which describes the heat transport from the surface to the surrounding medium for heat conduction through the body, is lessened due to the boundary layer in comparison with a sensor with predominantly flat end face.

The particular flow velocities at which a recirculation occurs, depends not least of all on the type of medium. Correspondingly, the angle of inclination of the side segments can vary in the case of different media.

The end face in the case of measuring tubes with small nominal diameters can also advantageously have a web, which extends in the flow direction of the medium. This web is especially advantageous in the case of measuring tubes with smaller nominal diameters, since there is then a smaller blockage of the medium on the sensor and smaller pressure losses.

Integrated in the sensor shown in FIG. 2, in such case, are components, which, on the one hand, serve for facilitating the manufacture and contribute to reducing the reject rate and, on the other hand, lessen the susceptibility of the temperature sensor to vibrations and moisture.

The sensor, respectively temperature sensor, of the present invention is not limited to an especially preferred sensor with one or more angled end surface segments, such as described above, but, instead, can also include sensors with planar end faces.

Inserted terminally in the housing chamber are resistance thermometers (RTD) 4 and 5 each parallel to one of the side segments 3a and 3c, of which at least one resistance thermometer is heatable. The resistance thermometers (RTD) 4 and 5 in the present example of an embodiment are embodied as thin-film resistance thermometers. For simplification, only the arrangement of one of the resistance thermometers 4 and 5 in the housing chamber will be explained.

The resistance thermometer is soldered on the inner side of the housing 1 in the housing chamber. Leading from the resistance thermometers 4 and 5 are their respective signal paths here in the form of connection wires 23, which preferably are gold coated. These connection wires connect the thin-film resistance thermometers to a circuit board 25.

The connection wires of the first of the two resistance thermometers are arranged in a first direction into the circuit board 25 and the connection wires of the second of the two resistance thermometers are arranged on or in a second direction opposite the first direction at or into the circuit board 25. By this arrangement, cable, respectively four conductor cable, can be led away from the circuit board on both sides. The changed arrangement of the connection wires and the cable, respectively four conductor cable, at the circuit board, means an assembly advantage can be achieved.

Terminally in the end region, the housing body is advantageously formed by a deep draw cap with reduced wall thickness of preferably between 0.5 and 2 mm. In this way, rapid heat transfer between the resistance thermometer 4 or 5 and the medium is enabled.

As recognizable in FIG. 2, the connection wires are, first of all, in each case, guided along the sides of the housing chamber. Then, the connection wires 23 are led to a circuit board 25 and secured with strain relief to the circuit board 25. The strain relieving securement of the connection wires facilitates the mounting of the temperature sensors. In the region between the thin film resistance thermometers and the circuit board, the connection wires are preferably jacketed with Teflon tubes (not shown).

Leading away from the circuit board 25 are a number of signal paths, present in the form of jacketed cables 27, respectively four conductor cables, which connect the temperature sensor with an evaluation unit. These extend unilaterally in FIG. 2 away from the circuit board.

Circuit board 25 includes lateral snap-in elements, which can engage with recess means 29 of the housing 1 or alternatively with a protrusion of the housing. A positive positioning of the circuit board in the housing means faster assembly.

Creating the recess means requires, however, a certain wall thickness, so that the recess means can be milled-in in the form of a peripheral groove 29. This cannot, however, be assured, due to the reduced wall thickness of the terminal deep draw cap. According to the invention, consequently, a reinforcing element with a recess means, preferably a peripheral groove, is arranged in the housing chamber on the wall of the deep draw cap.

This reinforcing element 31 enables a snap-in connection of the circuit board with the housing Alternatively or supplementally, also the housing 1 can have snap-in elements, which can engage with recess means or a protrusion of the circuit board 25. These snap-in elements can likewise be provided by a reinforcing element, which is arranged on the deep draw cap.

The housing chamber of the temperature sensor is terminally filled with silicone bodies 21, 22 between the circuit board and the housing wall with the resistance thermometers mounted thereon.

At the same time, the silicone bodies develop due to their inherent elasticity return forces, which act on the circuit board 25 and enable a more effective snap-in retention. In such case, the circuit board preferably touches at least one of the silicon bodies.

The strain relieving securement, respectively connection, of the connection wires 23 to the circuit board 25 will now be explained in greater detail.

Such occurs by leading the connection wires through a first hole in the circuit board 25, then in a direction perpendicular to the passageway of the first hole and then in a direction parallel to the passageway to the circuit board and then securing them. Thus, the securement occurs on a wall of the circuit board, which extends parallel to the first hole. Consequently, the connection wires are inserted in a first direction A into the hole of the circuit board and secured in a second direction B, which is opposite to the first direction A, on the circuit board.

Such strain relieving arrangements on boards are known from other fields of application and serve for a lasting securement of connection wires to a circuit board.

In the present case, however, the strain relief of the connection wires serves only for a better stability of the connections before and during potting.

The aforementioned mechanical measures for improving the securement of the circuit board and the thereto secured connection wires reduces the reject rate in the manufacture and the failure rates of the temperature sensor during operation are decisively reduced. In such case, individual measures, which per se already provide advantages, ideally contribute to a total concept. The aforementioned connection concept can basically be applied to all known multi-conductor measuring techniques of thermal flow measurement.

The invention claimed is:

1. A temperature sensor, comprising:
   a housing having a housing body and a housing chamber, in which housing chamber are arranged terminally two temperature sensor elements, which are especially embodied as thin-film resistance thermometers; and
   a circuit board, wherein:
   one of said temperature sensor elements is heatable;
   from each temperature sensor element at least one connection wire leads away, which is connected with said circuit board;
   said circuit board is arranged in said housing chamber;
   said circuit board is positioned in said housing chamber by a snap-in connection; and
   a terminally located part of said housing is embodied as a deep draw cap with a wall thickness of less than 2 mm, preferably less than 1.5 mm, especially less than 0.8 mm.

2. The temperature sensor as claimed in claim 1, wherein:
   said housing chamber has a reinforcing layer, which reinforcing layer has or forms a recess or protrusion for snap-in of said circuit board.

3. A temperature sensor, of a thermal, flow measuring device, comprising:

a housing having a housing body and a housing chamber, in which housing chamber are arranged terminally two temperature sensor elements, which are embodied as thin-film resistance thermometers; and a circuit board, wherein:

one of said temperature sensor elements is heatable;

from each temperature sensor element at least one connection wire leads away, which is connected with said circuit board; and a connection wire of a first temperature sensor element is led with strain relief in a first direction through said circuit board and connected with such.

4. The temperature sensor as claimed in claim 3, wherein:

a connection wire of a second temperature sensor element is led with strain relief in a second direction opposite the first direction through said circuit board and connected with such.

5. The temperature sensor as claimed in claim 3, wherein:

said connection wire of said first temperature sensor element is surrounded in the region of said circuit board with a potting compound.

6. A temperature sensor, of a thermal, flow measuring device, comprising:

a housing having a housing body and a housing chamber, in which housing chamber are arranged terminally two temperature sensor elements, which are embodied as thin-film resistance thermometers; and a circuit board, wherein:

one of said temperature sensor elements is heatable;

from each temperature sensor element at least one connection wire leads away, which is connected with said circuit board; and said housing chamber contains at least a first elastic body for guiding said connection wire.

7. The temperature sensor as claimed in claim 6, wherein:

there is arranged in said housing chamber a second elastic body, which is supported on said first elastic body and/or on a wall of said housing and exerts a return force on said snapped-in circuit board.

8. The temperature sensor as a claimed in claim 6, wherein:

said first elastic body is provided for lessening thermal and mechanical stresses on said connection wire in the case of tension loading.

9. The temperature sensor as claimed in claim 1, wherein:

said housing chamber contains a potting compound; and said temperature sensor elements are arranged free of potting compound in said housing chamber.

10. The temperature sensor as claimed in claim 6, wherein:

said first and said second elastic bodies are silicone bodies.

11. A temperature sensor, of a thermal, flow measuring device, comprising:

a housing having a housing body and a housing chamber, in which housing chamber are arranged terminally two temperature sensor elements, which are embodied as thin-film resistance thermometers; and a circuit board, wherein:

one of said temperature sensor elements is heatable;

from each temperature sensor element at least one connection wire leads away, which is connected with said circuit board;

said circuit board is arranged in said housing chamber;

said circuit board has a first number of cavities, for connection of connection wires and/or cables and a second number of cavities, for reducing thermal expansion of said circuit board.

12. The temperature sensor as claimed in claim 11, wherein:

said cavities, as holes, are arranged in conductive traces arranged on said circuit board.

13. The temperature sensor as a claimed in claim 11, wherein:

the temperature sensor is embodied as a four conductor measuring device.

14. The thermal, flow measuring device, comprising a temperature sensor as claimed in claim 11 and an evaluation unit.

15. A temperature sensor, comprising:

a housing having a housing body and a housing chamber, in which housing chamber are arranged terminally two temperature sensor elements, which are especially embodied as thin-film resistance thermometers; and a circuit board, wherein:

one of said temperature sensor elements is heatable;

from each temperature sensor element at least one connection wire leads away, which is connected with said circuit board;

said circuit board is arranged in said housing chamber;

said circuit board is positioned in said housing chamber by a snap-in connection;

said housing chamber has a reinforcing layer, which reinforcing layer has or forms a recess or protrusion for snap-in of said circuit board; and said reinforcing layer is mounted by material bonding to said housing body.

* * * * *